(12) United States Patent
Poon et al.

(10) Patent No.: US 8,944,695 B2
(45) Date of Patent: Feb. 3, 2015

(54) BEARING CARTRIDGE

(75) Inventors: Siu Yun Poon, Nottingham (GB); Michael Barnes, Nottingham (GB)

(73) Assignee: Romax Technology Ltd., Nottingham (GB)

( * ) Notice: Subject to any disclaimer, the term of this patent is extended or adjusted under 35 U.S.C. 154(b) by 712 days.

(21) Appl. No.: 12/854,921

(22) Filed: Aug. 12, 2010

(65) Prior Publication Data

US 2011/0037269 A1    Feb. 17, 2011

(30) Foreign Application Priority Data

Aug. 12, 2009 (GB) .................................. 0914089.8
Dec. 7, 2009 (GB) .................................. 0921385.1

(51) Int. Cl.

| | |
|---|---|
| F16C 43/04 | (2006.01) |
| F16C 23/10 | (2006.01) |
| F16C 23/00 | (2006.01) |
| F16C 37/00 | (2006.01) |
| F16C 19/52 | (2006.01) |
| F16C 19/54 | (2006.01) |
| F16C 25/06 | (2006.01) |
| F16C 35/04 | (2006.01) |

(52) U.S. Cl.
CPC ............... *F16C 37/007* (2013.01); *F16C 19/52* (2013.01); *F16C 19/548* (2013.01); *F16C 25/06* (2013.01); *F16C 35/04* (2013.01); *F16C 2240/40* (2013.01); *Y02E 10/721* (2013.01); *F16C 2361/61* (2013.01)
USPC ............................ 384/559; 384/563; 384/583

(58) Field of Classification Search
USPC ......... 384/556, 557, 559, 563, 581, 583, 584, 384/585, 626, 519, 538, 540; 29/893.1, 29/893.2, 898.04, 898.068, 898.07; 415/170.1, 229; 475/331, 348; 74/412 R, 413
See application file for complete search history.

(56) References Cited

U.S. PATENT DOCUMENTS

| | | | | |
|---|---|---|---|---|
| 2,540,767 | A | * | 2/1951 | Tabbert ............................. 418/2 |
| 3,178,967 | A | * | 4/1965 | Fritsch ........................... 475/346 |
| 4,085,984 | A | * | 4/1978 | Cameron ....................... 384/563 |
| 4,112,786 | A | * | 9/1978 | Thomas ....................... 74/606 R |
| 4,463,622 | A | | 8/1984 | Freiburger |
| 5,743,016 | A | * | 4/1998 | Manne et al. ............. 29/898.062 |
| 6,244,751 | B1 | * | 6/2001 | Rode .............................. 384/551 |

(Continued)

FOREIGN PATENT DOCUMENTS

| | | |
|---|---|---|
| DE | 1158376 | 11/1963 |
| EP | 1992829 B1 | 3/2011 |

(Continued)

*Primary Examiner* — James Pilkington
*Assistant Examiner* — Adam D Rogers
(74) *Attorney, Agent, or Firm* — Galgano & Associates, PLLC; Thomas M. Galgano; Jessica G. Bower

(57) ABSTRACT

A bearing cartridge for a rotatable shaft of a wind turbine comprising a shaft and a back-to-back tapered roller bearing arrangement coupled to the shaft. The bearing arrangement comprising a first bearing having a first outer ring, a first inner ring and a plurality of tapered rollers; and a second bearing having a second outer ring, a second inner ring and a plurality of tapered rollers. The bearing cartridge further comprising a gear located on the shaft between the first bearing and second bearing and a sleeve for supporting an axial load between the first and second bearings and having one or more apertures that expose the gear for coupling to an external gear.

13 Claims, 14 Drawing Sheets

(56) References Cited

U.S. PATENT DOCUMENTS

| | | |
|---|---|---|
| 6,283,639 B1 | 9/2001 | Rode |
| 6,886,985 B1 | 5/2005 | Kostrzewsky et al. |
| 7,090,609 B2 * | 8/2006 | Ziech et al. .................. 475/220 |
| 7,410,442 B2 * | 8/2008 | Fox ................................ 475/343 |
| 7,695,399 B2 * | 4/2010 | Sowul et al. .................. 475/331 |
| 7,935,020 B2 * | 5/2011 | Jansen et al. ................. 475/338 |
| 7,950,154 B2 * | 5/2011 | Leimann ..................... 29/898.09 |
| 8,403,786 B2 * | 3/2013 | Bech ................................ 475/5 |
| 2004/0141674 A1 | 7/2004 | Leimann |
| 2005/0032600 A1 | 2/2005 | Ziech et al. |
| 2010/0040320 A1 * | 2/2010 | Clark ............................ 384/557 |
| 2012/0144939 A1 * | 6/2012 | Kullin et al. ..................... 74/25 |

FOREIGN PATENT DOCUMENTS

| | | |
|---|---|---|
| GB | 716411 A | 10/1954 |
| JP | 03-254840 A | 9/2003 |
| JP | 05-113805 A | 4/2005 |
| JP | 2006-189123 | 7/2006 |
| JP | 08-157340 A | 7/2008 |
| KR | 20-0158185 | 10/1999 |
| WO | 02/073054 A1 | 9/2002 |
| WO | WO 02/073054 A1 | 9/2002 |
| WO | 02/079658 A1 | 10/2002 |
| WO | WO 2005/005866 A1 | 1/2005 |

* cited by examiner

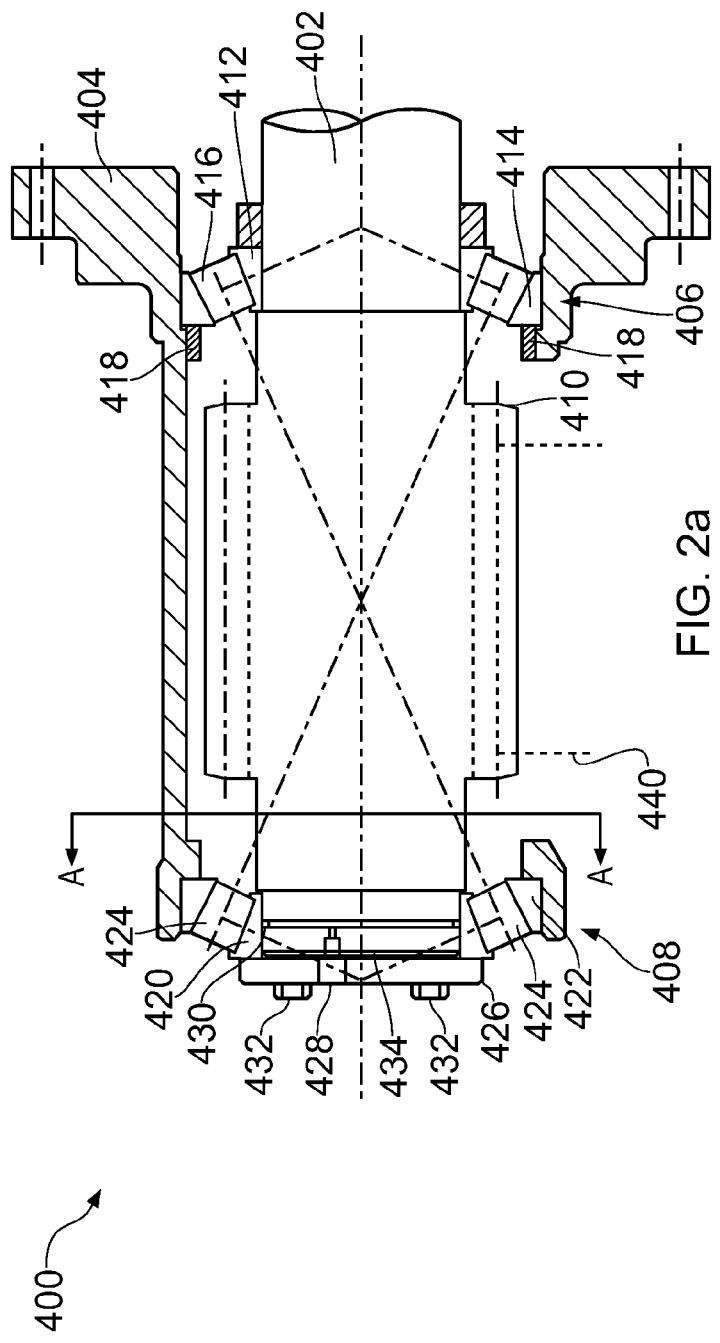
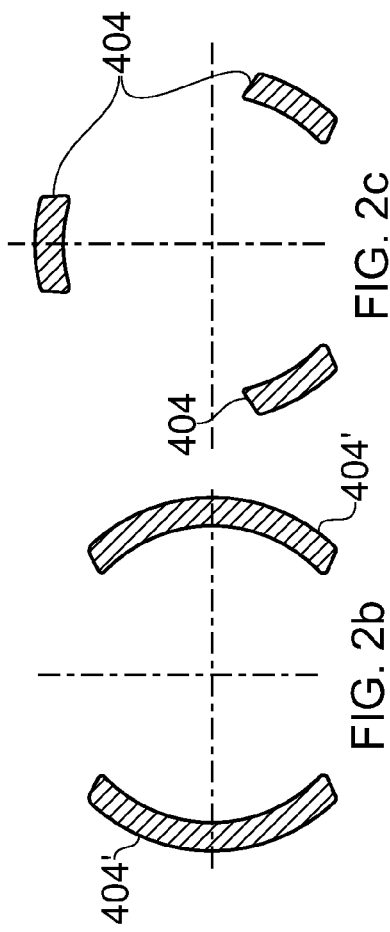
FIG. 2a
FIG. 2b
FIG. 2c

BEARING CARTRIDGE

BACKGROUND OF THE INVENTION

1. Field of the Invention

The present disclosure relates to the field of bearing cartridges, and in particular, but not necessarily, to heavy duty bearing cartridges that are suitable for gear boxes that are located in wind turbines.

2. Description of Related Art

The first stage of any bearing selection procedure is to calculate the radial and axial load that is to be supported by the bearing. For a shaft carrying one or more gears, the load at the bearings is produced by the forces generated at the contact point of the gear teeth, by the weight of the gears and shaft, and by any external loads applied to the shaft.

The resultant axial and radial forces carried by the bearings are calculated in magnitude and direction by taking moments and by resolving forces so that for a specific transmitted torque, a single value of the radial and axial load can be derived for each bearing.

In examples where two bearings are mounted close together as a bearing pair at one position on the shaft, and a third bearing is mounted to support the other end of the shaft, the load on the bearing pair can be calculated but the load distribution at each bearing of the pair can only be determined by advanced analysis as shaft and housing deflections and bearing radial internal clearance will affect the distribution.

The second stage of the bearing selection is to use the fatigue life rating formulae to determine the required equivalent catalogue load. The simple rating theory formula for roller bearings is of the form:

$$L_{10} = \left(\frac{C}{P}\right)^{\frac{10}{3}}$$

Where:
$L_{10}$ is the lifetime in million cycles that 90% of bearings will survive. In other words, $L_{10}$ is the lifetime in million cycles for which less than 10% of bearings will show the onset of fatigue damage;
C is the dynamic equivalent radial load rating for the specific bearing, and may be known as a "catalogue value"; and
P is the calculated dynamic equivalent radial load for the bearing.

In practice, this basic formula is often replaced by a more complicated calculation which allows much better estimations to be made:

$$L_n = a_n \cdot a \cdot \left(\frac{C}{P}\right)^{\frac{10}{3}}$$

Where:
$L_n$ is the lifetime in million cycles that (100−n) % of bearings will survive. In other words, $L_n$ is the lifetime in million cycles for which less than n % of bearings will show the onset of fatigue damage;
$a_n$ is a factor to convert the $L_{10}$ life to a failure rate above or below n %. For example for n=5% then $a_n$=0.62, and for n=1% then $a_n$=0.21; and According to DIN ISO 281 "a" is a life factor which may encompass many other factors and may increase or decrease the bearing life. The value for "a" can include adjustments for bearing materials, temperature and speed and bearing operating conditions, for example lubrication.

The design data and the catalogue values are used in an attempt to ensure that a statistical number of bearings will not fail due to running at excessive loads.

In addition, it is important to ensure that there are no static conditions that will cause bearings to fail, and the worst static conditions should be checked against a catalogue static value $C_0$.

There is also another criterion that should be considered. Bearings can fail due to too little load, and this can cause the rolling elements of the bearing to rotate at incorrect speeds in relation to a shaft, and therefore cause the bearings to skid or smear. Manufacturers give guidance on the minimum values of load that must be maintained to avoid skidding or smearing. Skidding or smearing is especially likely to cause damage in applications where the bearings are running at above 75% of the recommended maximum speed; are large in diameter; and are running in applications where there are rapid shaft accelerations or decelerations. These are conditions that can be found on the high speed shaft of a typical wind turbine gearbox.

In wind turbine applications, it is possible that during periods of running at rated speed, the variation in wind speed can be such that there are times when the transmitted torque can be zero or negative. During such periods, in order to achieve the minimum loading required to avoid skidding and smearing, a force other than forces generated by transmitting power/operating load is required. Sometimes the shaft weight or external forces can ensure that a suitable load is achieved, but where this is not the case some other method should be used. A known bearing manufacturer, SKF, recommend using preload to achieve the minimum load for taper roller bearings.

"End float" occurs when bearings do not exert any force on a shaft, and "zero end float" occurs when bearings are just touching a shaft but not exerting any force on the shaft. Any force that is applied to the shaft is known as preload.

There are two general configurations to mount taper roller bearings. They can be mounted face to face, known as an 'X' arrangement and shown in FIG. 1a, or back to back, known as an 'O' arrangement as shown in FIG. 1b. In either configuration it is likely to be necessary to set the bearings to a specific preload or end float after assembly.

According to the 'X' arrangement shown in FIG. 1a, the shaft 102, inner ring 104 and rollers 106 can heat up more than the outer ring 108 and housing 110. This heating causes the shaft length to increase and the diameter of the shaft 102 that is in contact with the rollers 106 to also increase. Due to the geometry of the rollers 106, the radial increase and the axial increase of the shaft provide an additive effect as both will cause the force exerted by the shaft 102 on the rollers 106 to increase, thereby increasing the preload on the bearing. This arrangement is severely affected by changes in the temperature of the components, but is commonly used because it is relatively easy to design adequate bearing support and is easy to adjust the preload or end float on assembly.

According to the 'O' arrangement shown in FIG. 1 b, the shaft 204 is supported by a first bearing arrangement 207 that comprises a first set of tapered roller bearings 208 located between an inner ring 214 and an outer ring 212, and a second bearing arrangement 209 that comprises a second set of tapered roller bearings 216 located between a second outer ring 220 and a second inner ring 222.

It will appreciated that in use, one or more of the shaft 204, inner rings 222, 214, rollers 208, 216, outer rings 212, 220 and housing 202 will be heated up as the parts move relative to each other. As one or more of the above parts heat up, their physical dimensions increase.

In this example, the bearing arrangements 207, 209 are spaced apart so the cone apices of the outer rings 212, 220 coincide at one point on the centreline of the shaft 204. In this case, radial expansion of the shaft 204 will increase the preload on the bearings 207, 209 and the increased radial dimension of the shaft 204 exerts an increased force on the rollers 208, 216. In contrast, axial expansion of the shaft 204 will decrease preload on the bearings 207, 209 because axial expansion of the shaft 204 causes the shaft 204 to encounter a region of the rollers 218 having an increased diameter. That is, as the shaft 204 axially expands, its contact point moves along, and up, the surface of the rollers 208, 216. In the example shown in FIG. 1b it can be difficult to find a method to assemble and adjust the preload or end float.

In order to design such bearing arrangements that do not fail due to thermal expansion, a theoretical analysis is performed as discussed above. The simple form of such analysis assumes that the shaft 204, inner rings 214, 222 and tapered roller bearings 208, 216 (which may be known as the inner components) are made of the same material and are heated by the same amount to a first temperature when in use. In addition, the housing 202 and the outer rings 212, 220 (which may be known as the other components) are also assumed to be made of the same material as each other and also subjected to the same heating to a second temperature. The first temperature is assumed to be greater than the second temperature, and for ease of analysis, the temperature and material of one or more of the components are considered to be uniform.

In the case where all shaft/inner components are at a single temperature and all housing/outer components are at a single, but different, temperature the changes in preload due to radial and axial expansion theoretically cancel out.

In the example shown in FIG. 1b, the angles of the tapered roller bearings 208, 216 are set such that the theoretical roller cone apices intersect on the centreline of the shaft 204. In this way, the axial and radial thermal expansions of the bearing arrangement are theoretically balanced and therefore the preload does not increase when the dimensions of the components of the bearing arrangement 200 increase.

However, in reality there will always be changes in preload as the temperature changes because the temperature of the shaft, inner ring and rollers will not be uniform throughout, and also the temperature of the housing and outer ring will not be uniform. In addition there may be different coefficients of expansion in different components and any interference of rings on the shaft and housing will not behave in the same way as a uniform material.

It can be difficult in practice to mount a shaft in a manner that provides proper axial support for the outer rings and also to satisfactorily set the preload on the bearings for all operating temperatures of the shaft, which does not lead to failure of the bearings.

In addition to the example shown in FIG. 1b, it is possible to have two other conditions of 'O' (back-to-back) bearing arrangements, as shown in FIGS. 1c and 1d. For the arrangement shown in FIG. 1c, where the roller cone 302 apices overlap, an increase in shaft 304 temperature causes an increase in preload because the effect of the radial expansion of the shaft 304 outweighs the effect of the axial expansion of the shaft 304.

For the arrangement shown in FIG. 1d, where the roller cone 332 apices do not intersect, an increase in shaft 334 temperature causes a decrease in preload because the effect of the axial expansion of the shaft 334 outweighs the effect of the radial expansion of the shaft 334.

The prior art teaches that back to back and spaced apart arrangements of taper roller bearings are not commonly used because it is hard to engineer a suitable arrangement which allows easy assembly and setting of a desired preload.

FIG. 1e illustrates an alternative prior art bearing arrangement. The bearing arrangement comprises a combination of a cylinder roller bearing 364 and a face-to face taper roller bearing 362. The taper roller bearing 362 takes axial and radial loads, and the cylindrical roller bearing 364 only takes radial loads. It is also possible to use a back to back arrangement for the taper roller bearing pair as shown in FIG. 1f, but in both face to face and back to back arrangements the effect of radial expansion of the shaft 366 makes it impossible to keep the load on the bearings within the desired preload range. It may not be possible to design the taper roller bearing pair in order to meet these design criteria.

The cylinder roller bearing 364 also needs to meet the minimum and maximum loading requirements in the same way as the taper roller bearing pair, and in prior art arrangements this cannot be achieved at zero torque.

Existing calculations reveal that it is not possible to design a bearing arrangement that maintains a preload on the bearings that is sufficient to exceed a 2% minimum load when the shaft is running at zero torque, without the bearings being overloaded at some temperatures within the expected operating range and/or it can be difficult or impossible to set the bearings to the correct preload. The design of the taper roller bearing pair cannot be made to meet these design criteria as discussed in more detail below.

An object of one or more embodiments described herein is to provide an arrangement that can achieve an insignificant change in preload over the full running temperature range of the bearings arrangement and/or shaft, and/or provide a bearing arrangement in a manner that can allow easy and controlled conditions for setting the preload. Also, the bearing cartridge may be easily assembled.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

BRIEF SUMMARY OF THE INVENTION

According to a first aspect of the invention, there is provided a bearing cartridge for a rotatable shaft of a wind turbine comprising:
  a shaft;
  a back-to-back tapered roller bearing arrangement coupled to the shaft, comprising:
    a first bearing having a first outer ring, a first inner ring and a plurality of tapered rollers; and
    a second bearing having a second outer ring, a second inner ring and a plurality of tapered rollers;
  a gear located on the shaft between the first bearing and second bearing; and
  a sleeve for supporting an axial load between the first and second bearings and having one or more apertures that expose the gear for coupling to an external gear.

The sleeve can enable the formation of a pre-assembled bearing cartridge that is suitable for coupling to an external gear, such as a gearbox. The pre-assembly can enable parameters of the bearing cartridge such as the axial displacement of the first and second bearings to be pre-set before the bearing cartridge is coupled to an external gear. Such pre-setting may be considered as workshop setting under controlled conditions.

The sleeve can control the preload applied to the bearings and/or support the axial load between the first and second bearings, independently of providing mechanical support for the gear. The gear is located on the shaft and the gear may not be supported by the sleeve.

Such a bearing cartridge having one or more apertures can enable the gear to be located between the first and second bearings and still mesh with an external gear, such as the gears of a gearbox. This can provide a more robust bearing cartridge, that is less susceptible to failure than the prior art, as the requirement to use an outboard or overhung gear can be avoided. The associated stresses and forces caused by an overhung gear, such as deflection of the shaft, can be reduced or avoided.

Use of such a bearing cartridge can also enable a preload, particularly axial dimensional preload, that is provided by the bearings to be set before the bearing cartridge is located in use. Such bearing cartridges may be coupled to gearboxes where it can be difficult and/or inconvenient to adjust bearings settings. For example, typical uses of bearing cartridges according to an embodiment of the invention include offshore wind farms, and wind farms that are in an extremely hot or cold environment, for example in temperatures ranging from −30° C. to +40° C. It will be appreciated that being able to set the preload of the bearing cartridge before it is located in its in-use location can enable more reliable settings to be performed. The design of the bearing cartridge can be made such that a minimum dynamic load that is experienced by the bearing in use is kept above a predefined value, and in particular can ensure that the minimum dynamic load is maintained for all operating conditions, including temperatures, of the bearing cartridge and/or shaft. This may be provided, at least in part, by the use of a back-to-back bearing tapered roller arrangement In some embodiments, all settings for preload can be made as a bench setting under controlled conditions. In one embodiment it is possible to alter 1) cartridge axial stiffness to adjust the ratio of dimensional preload to force preload and/or 2) the actual separation of the bearings to choose the best location of the cone points of the tapered roller bearings. For example the cone points can be set so that they are overlapping, spaced apart, or coincident. The best location of the cone points may be considered as providing the lowest change in preload over the expected temperature operating range.

The bearing cartridge may be a unitary, pre-adjusted, pre-lubricated assembly that can be used to replace bearing components in a typical bearing housing. There may be no need to rebuild the bearing or to replace an entire bearing-housing as a new bearing cartridge can simply replace an old bearing cartridge. This can avoid long and costly repair of bearings or the replacement of the entire bearing-housing assembly after a pre-existing typical bearing has failed. This can be advantageous in examples where the bearing cartridge is for a wind turbine that is located at sea, wherein the cost of machinery that is required to replace a bearing cartridge according to an embodiment of the invention can be less expensive and time consuming than replacing a prior art bearing directly between the housing and the shaft where heavy machinery such as very large floating cranes may be required. One or more bearing cartridges of embodiments of the invention can last for longer than prior art bearings, and therefore the frequency with which the bearing cartridges need to be replaced can be reduced.

The sleeve may also be configured for supporting/connecting the bearings. The sleeve may be configured to keep the first and second bearings in a correct position relative to a shaft, when in use. For example, the sleeve may restrict the axial location of the first and second bearings relative to each other. The first and/or second bearings may or may not be constrained within the sleeve, and therefore the sleeve may, or may not, restrict the radial location of the first and/or second bearings.

One or more physical parameters of the bearing cartridge may be adjustable in order to vary the load/preload force that is applied to the bearing arrangement when it is coupled to an external gear of a rotating shaft in use. The one or more physical parameter may be directly adjustable, such as by using screw threaded components to adjust the displacement between bearings, or may be indirectly adjustable for example by controlling environmental conditions, such as the temperature of the sleeve, that the bearing cartridge is exposed to when in use.

"In use" can mean that the gear of the bearing cartridge is coupled to an external gear. For example, the gear of the bearing cartridge may be coupled to a gearbox in a wind turbine. The bearing cartridge may be considered to be in use when it is coupled to the external gear and is stationary, and/or when it is coupled to the external gear and the shaft is rotating.

The axial distance between the first and second bearings may be adjustable, and this can adjust the axial dimensional preload on the bearing.

In some embodiments, all adjustment can be made as a bench setting under controlled conditions of temperature and cleanliness, and with ease of measuring such things as the torque to rotate the shaft within the cartridge. Measuring torque can be used as a check that preload has been set correctly. It may not be convenient/possible to perform this check when the bearing cartridge is coupled to an external gear.

The axial distance between the first and second bearings may be adjustable by means of a screw threaded adjuster. In some embodiments, the preload can be adjusted by adjusting the position of one outer ring in the housing, with the inner rings mounted to the shaft. The outer rings may be a free fit in the housing and the inner rings may be an interference fit on the shaft. In some embodiments, the stationary load line may be a free fit and the rotating load line may be an interference fit. This can stop the bearing ring precessing on the shaft or in the housing. In some embodiments, it may be more convenient to adjust forces at a distal end of the bearing cartridge instead of the outer rings. The distal end of the bearing cartridge may be considered as the end that is not configured for mounting to a housing.

The location of the bearing at the distal end of the bearing cartridge can be adjusted using shims between the shaft and an end plate that covers an end of the shaft. Initially, excess shims can be used so that it is physically possible to measure an end float in a conventional way. Then, in order to change the end float, shims can be added to increase end float if required, or shims can be removed to decrease the end float until a preload is obtained. A physical problem here can be that for a conventional bearing design having a rotating load line, the bearing will be a press fit on the shaft that can make it difficult to adjust the preload. Therefore, in some examples of the invention there can be two ways to adjust the preload.

High pressure oil or another liquid (for example glycol) can be injected between the shaft and the inner ring so that the inner ring is effectively floating on oil as it moves along the shaft. The bearing can be free from significant contact friction during adjustment and therefore require low forces to move the ring and adjust the displacement between the bearings.

Alternatively, the relative locations of the shaft and inner ring can be adjusted to clearance and then LOCTITE anaerobic adhesive or a similar fluid can be used as a filler to stop or reduce precession/movement of the inner ring along the shaft. A LOCTITE anaerobic adhesive may be considered as an anaerobic adhesive and can be inserted into a cavity between the shaft and inner ring in a liquid state, before setting as a solid when it makes contact with the steel of the assembly. The LOCTITE anaerobic adhesive may provide the equivalent of an interference fit between the inner ring and the shaft when it is set.

The bearing cartridge may further comprise a conduit through the shaft. The conduit may open into a cavity between the inner ring of the first or second bearing and the shaft. The cavity may be configured to receive oil, liquid or LOCTITE anaerobic adhesive through the conduit in order for the relative location of the first and second bearings to be adjustable. The oil, liquid or LOCTITE anaerobic adhesive may be provided to a cavity between the inner ring and the shaft through conduits/galleries in the shaft.

The bearing arrangement may be adjustable such that the preload/load on the bearing in use is maintained above a minimum value. The load may comprise an element of dynamic equivalent load and/or an element of preload.

The minimum value may be 4% of the load rating (catalogue value) of the bearing. In other embodiments, the minimum value may be 1%, 2%, 3%, 5% or any other value that prevents the bearing from sliding/skidding or otherwise degrading the quality of the bearing. Keeping the preload on the bearing arrangement above the minimum value can reduce the chance of the bearing failing.

The bearing arrangement may be adjustable such that the preload/load on the bearing in use is maintained below a maximum value.

The maximum value may be 13% of the load rating (catalogue value) of the bearing. In other embodiments, the maximum value may be in the range of about 6% to 30%, for example, 10%, 15%, 20% or any other value that enables the bearing to achieve a desired lifetime. Keeping the preload on the bearing arrangement below the maximum value can reduce the chance of the bearing failing. It will be appreciated that lower maximum values for the preload on the bearing arrangement may be required for high speed shafts requiring long lives, and this can be because the shaft will rotate more than the arbitrary catalogue figures that are used to calculate a bearing's expected lifetime, thereby performing more revolutions in its required lifetime.

In some situations the life factor "a" for the bearing arrangement can be quite large and/or can be an inaccurate estimation, and this can mean that only a small operating window between the desired minimum and maximum values for dynamic load is available. Also, it may be more common to perform calculations in order to provide bearing designs for which 95% of bearings will survive (the $L_5$ value).

The preload of the bearing arrangement may be adjustable when the bearing cartridge is not fitted to an external gear, for example when the bearing cartridge is not coupled to a gearbox. Bench setting methods may be used to set the preload of the bearing arrangement. Bench setting may avoid or reduce the need for setting or adjusting the bearing when it is coupled to a gearbox.

The back-to-back bearing arrangement may be a spaced apart back-to-back bearing arrangement. The back-to-back bearing arrangement may use standard bearing angles. In some embodiments, the use of standard bearing angles can allow for convenient assembly using existing bearings. In other embodiments, non-standard bearing angles may be used.

The cone points of the tapered rollers of the first and second bearings may be coincident, or may be offset relative to each other.

The sleeve may have an axial stiffness that is configured to provide a preload force on the bearings that accommodates a change in the dimensional separation of the bearings. The sleeve may be configured so as to dissipate dimensional increases in the sleeve as it compresses, and thereby may only convert dimensional changes into small changes of preload forces applied by the bearings. The sleeve may have an axial stiffness that is a suitable value for deflection and strength.

The bearing cartridge may be configured to be fitted to an external gear when the bearing cartridge is in situ. The bearing cartridge may be in situ in a wind turbine, and the bearing cartridge may be located within a gearbox.

The bearing cartridge may provide a substantially neutral preload temperature characteristic. That is, the amount of force applied by the shaft to the bearings caused by preload may not significantly change for different operating temperatures.

The bearing cartridge may further comprise a temperature controller configured to adjust the temperature of the sleeve when the bearing cartridge is in use.

The sleeve may comprise one or more conduits. The one or more conduits may be configured to receive oil or any other heat carrying fluid, the conduits being in fluid communication with the temperature controller.

The temperature controller may include an electric heater.

Adjusting the temperature of the sleeve can cause the sleeve to expand or contract thereby changing the distance between the two bearings fitted at either end of the sleeve. In this way, the preload on the bearings can be adjusted whilst the bearing cartridge is in use, and the preload can be adjusted so that it stays within a desired range of values.

The temperature controller may be controlled by a processor that provides control signals to the temperature controller responsive to signal received from a sensor, wherein the signals received from the sensor are indicative of whether the preload/load on the bearings is too high or too low and/or whether it is caused at high or low torque.

The temperature controller may be controlled by a processor that provides control signals to the temperature controller responsive to a signal received from one or more sensors. The signals received from the one or more sensors may be indicative of whether the preload on the bearings is too high or too low, and for example may be representative of the temperature of the shaft, a component of one of the bearings, operating conditions of an associated gearbox, or any other characteristic. The sensors may comprise one or more strain gauges, and the strain gauges may be configured to measure axial load in the bearing cartridge. Such a temperature controller may be useful if the operating or warm up conditions do not keep the preload within the desired preload operating window; that is between the desired minimum and maximum values because the preload values can be dynamically controlled during start up.

In other examples, the bearing cartridge may be used at a high ambient temperature that would cause the preload to exceed the maximum desired value. Therefore, the temperature controller can be used to control the temperature of the sleeve, and hence the preload of the bearings, during normal operating conditions for given environmental conditions.

The bearing cartridge may be for high-speed rotating shafts. The bearing cartridge may be for a gear box and/or may be for use in a wind turbine.

The sleeve of the bearing cartridge may comprise a first sleeve portion and a second sleeve portion that are releasable connected together. The first sleeve portion may axially and/or radially support the first bearing, and the second sleeve portion may axially and/or radially support the second bearing.

The first sleeve portion and/or the second sleeve portion may comprise the one or more apertures that expose the gear for coupling to an external gear. The one or more apertures may extend to a distal end of the first and/or second sleeve portion. The first and second sleeve portions may be located next to each other in a longitudinal direction along the shaft when they are connected together.

Providing such a two-part sleeve can enable the bearing cartridge to be conveniently coupled to a gearbox, particularly where the gear located on the shaft is a large gear. Such an embodiment can be particularly advantageous when the gear on the shaft has a larger diameter than the bearings, as otherwise it may not be possible to assemble the gear between the bearings. A two-part sleeve can be considered as enabling a self-contained cartridge having a gear with a larger diameter than the bearings to be provided.

For embodiments where the diameter of the gear extends sufficiently past the outer diameter of the bearings, the bearing cartridge can be fitted to an external gear in a direction that is substantially parallel to an in-use longitudinal direction of the bearing cartridge. In this way, the size of an access hole in a casing associated with the external gear can be reduced/minimised.

A two-part sleeve can conveniently allow the bearing cartridge to be assembled from a distal end of the bearing cartridge after the gear on the shaft has been coupled to an external gear, such as the gear of a gearbox.

According to a further aspect of the invention, there is provided a bearing cartridge for a rotatable shaft of a wind turbine, the bearing cartridge comprising:

a shaft;

a bearing arrangement coupled to the shaft, the bearing arrangement comprising a first bearing and a second bearing;

a sleeve for supporting an axial load between the first and second bearings; and a temperature controller configured to adjust the temperature of the sleeve in order to adjust the axial load between the first and second bearings.

Such a bearing cartridge can enable a dynamic adjustment of the preload provided by the sleeve on the bearings, and can take into account actual use conditions including the environment and operating load. It will also be appreciated that such a bearing cartridge can optionally include any other features of other bearing cartridges disclosed herein.

There may be provided a gearbox fitted with a bearing cartridge described herein, and/or there may be provided an apparatus having gearbox fitted with a bearing cartridge described herein.

There may be provided a wind turbine comprising a bearing cartridge as described herein and/or a gearbox described herein.

BRIEF DESCRIPTION OF THE SEVERAL VIEWS OF THE DRAWINGS

A description is now given, by way of example only, with reference to the accompanying drawings, in which:—

FIG. 2a shows a cross sectional view of a bearing cartridge according to an embodiment of the invention in use on a shaft;

FIG. 2b shows a cross sectional view of the bearing cartridge of FIG. 2a along the line A-A;

FIG. 2c shows a cross sectional view of an alternative bearing cartridge according to an embodiment of the invention;

FIG. 3b shows a bearing cartridge according to an embodiment of the invention fitted to a shaft in the gearbox housing of FIG. 3a;

DETAILED DESCRIPTIONS OF THE INVENTION

Figure 1A:
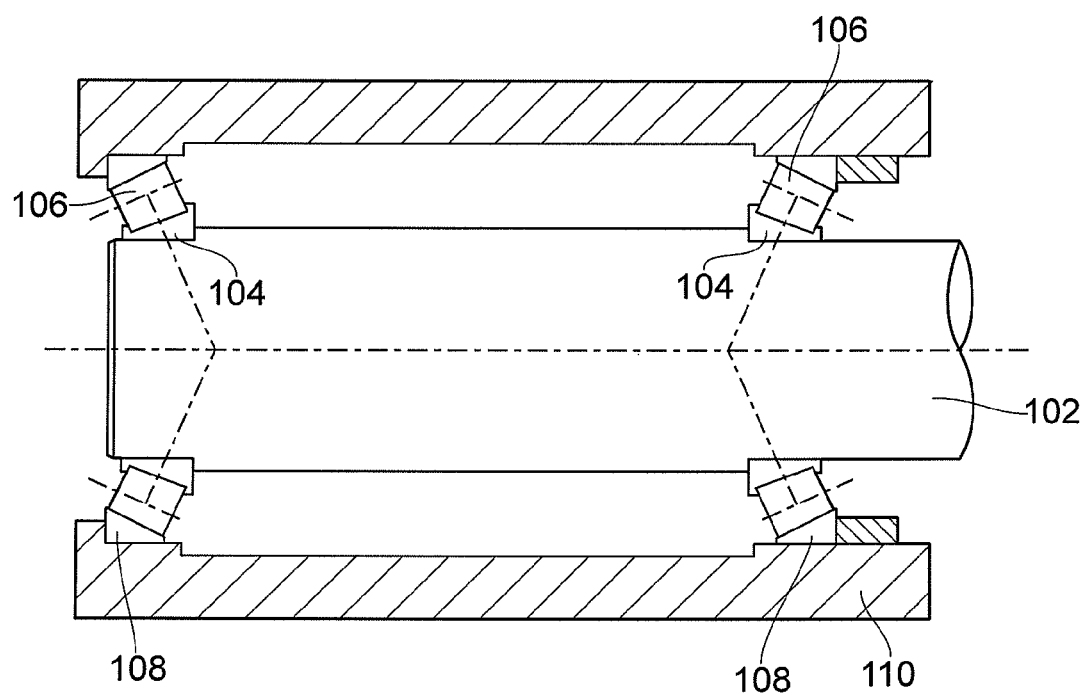
FIGS. 1a to 1f illustrate cross-sectional views of example prior art bearing arrangements.

One or more embodiments described herein comprise a bearing cartridge suitable for a rotatable shaft of a wind turbine, wherein the bearing cartridge comprises a back-to-back bearing arrangement, a sleeve having one or more apertures, and a gear. The back to back bearing arrangement is coupled to the sleeve such that, in use, the sleeve maintains the bearing arrangement in the correct axial position and supports a load between the bearings. The gear is located on the shaft between the bearings. Locating the gear between the bearings such that it is exposed through the one or more apertures in the sleeve can enable a more robust bearing cartridge to be provided. Embodiments of the invention can avoid the need for an outboard gear such that the forces that are applied to the bearing arrangement can lead to a longer operational lifetime of the bearing cartridge.

In some embodiments, one or more physical parameters associated with the bearing cartridge such as the distance between the bearings can be preset before the bearing cartridge is fitted to an external gear to take into account dimensional preload variations of the bearing cartridge when it is in use, for example due to changes in temperature. The physical parameters of the bearing cartridge can be adjusted as part of a bench setting operation.

Some embodiments described herein specifically relate to angular contact bearings and in particular taper roller bearings because it is this type of bearing which can be likely to have the required load capacity for application in wind turbines. It is known that specific care has to be taken in the application of taper roller bearings because the running preload/end float can change significantly during use inner components of the bearing cartridge can heat up more than outer components of the bearing cartridge.

In some embodiments, tests can be made during operation of the shaft, and/or thermal analysis can be used to obtain an estimate of component temperature such that the design of the bearing cartridge can be adjusted accordingly. For example, the axial location of the bearings can be adjusted such that during operation the dynamic equivalent load on the bearing is maintained above a minimum value, such as 4% of the load rating (catalogue value) of the bearing. It has been found that bearings are known to fail when the load on the bearings is very low, particularly when the shaft is moving at high speeds as the bearings may slide and/or skid if sufficient load/preload is not maintained.

FIG. 2a shows a cross sectional view of a bearing cartridge 400 according to an embodiment of the invention, and FIG. 2c shows a cross sectional view of the sleeve along the line A-A illustrated in FIG. 2a.

The bearing cartridge 400 comprises a shaft 402, a sleeve 404, a first bearing 406 and a second bearing 408 and a gear 410. The first and second bearings 406, 408 are spaced apart tapered roller bearings and are supported by the sleeve 404.

In this embodiment, the sleeve 404 does not completely extend around the circumference of the bearing cartridge 400 along the length of the bearing cartridge 400 as is best seen in FIG. 2c. The gaps in the sleeve 404 may be considered as windows or apertures in the sleeve 404. This can allow one or more gears 410 that are present on the shaft 402 to be available through the windows in the sleeve 404. In the example of FIG. 2c, the sleeve has three windows that are equiangularly spaced around the circumference of the sleeve 404'.

It will be appreciated that the one or more gears 410 can mesh with an external gear 440, such as an external gear of a gearbox, in use.

FIG. 2b illustrates another embodiment of a sleeve 404' according to an embodiment of the invention which shows an alternative cross-sectional view of the sleeve along the line A-A in FIG. 2a. In this example, the sleeve 404' has two windows that are opposite each other.

Returning to the embodiment illustrated in FIG. 2a, the first bearing 406 comprises an inner ring 412 and outer ring 414, in between which are mounted a plurality of tapered rollers 416. In this embodiment, one or more adjusters 418 are located to one side of the first bearing 406 in order to be able to adjust the axial displacement between the first bearing 406 and the second bearing 408. In this example, the adjusters 418 are screw-threaded adjusters, and in particular an externally screw threaded ring 418 whereby turning the ring 418 causes the outer ring 414 of the first bearing 406 to be axially displaced either towards or away from the second bearing 408. The adjusters 418 may be fitted with a suitable locking means (not shown) to prevent any undesired adjustment that may be caused by rotation for example.

It will be appreciated that embodiments of the invention described herein can allow one or more of the adjusters 418 to be set before the bearing cartridge 400 is coupled to a gearbox. This may be considered as "bench setting". This can be advantageous in situations where it is difficult for a person to gain access to the adjusters 418 when the bearing cartridge is coupled to a gearbox such as in a wind turbine.

Figure 1B:
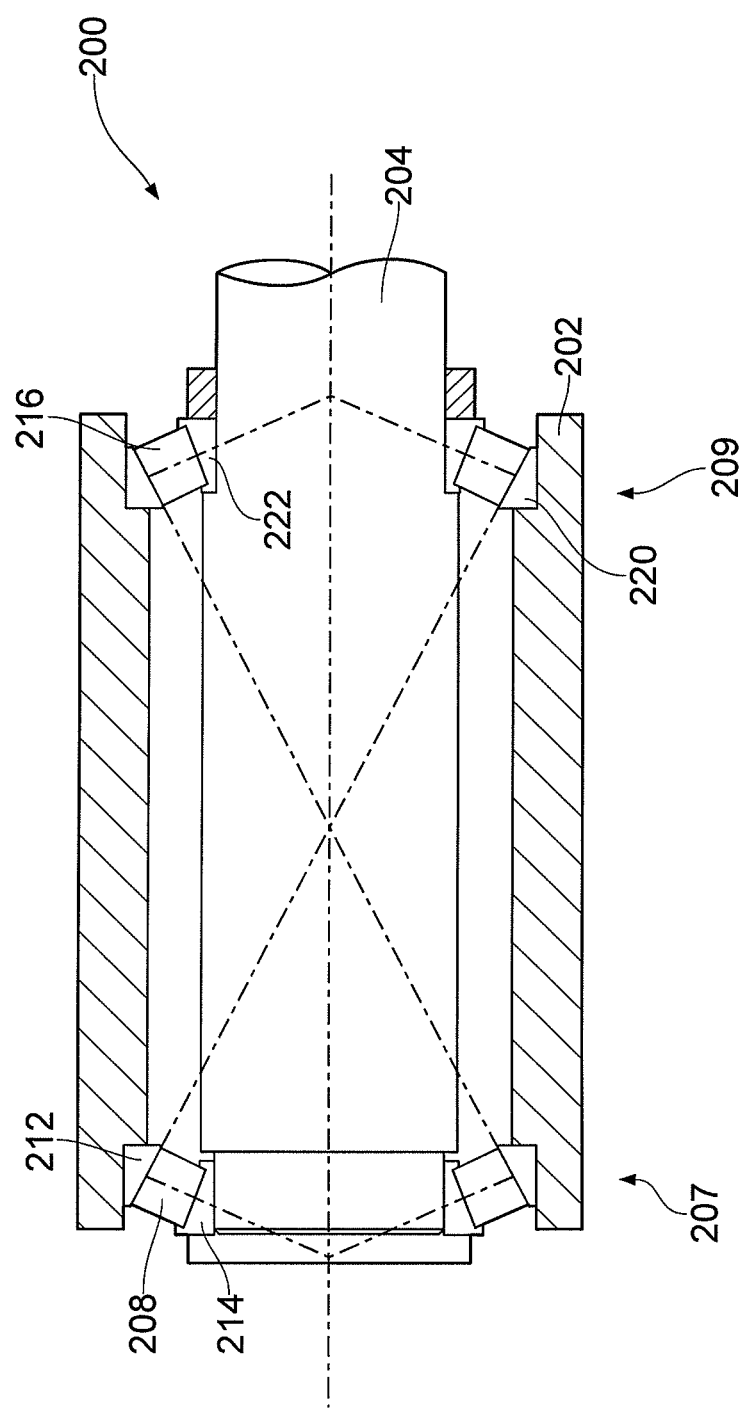
Figure 1C:
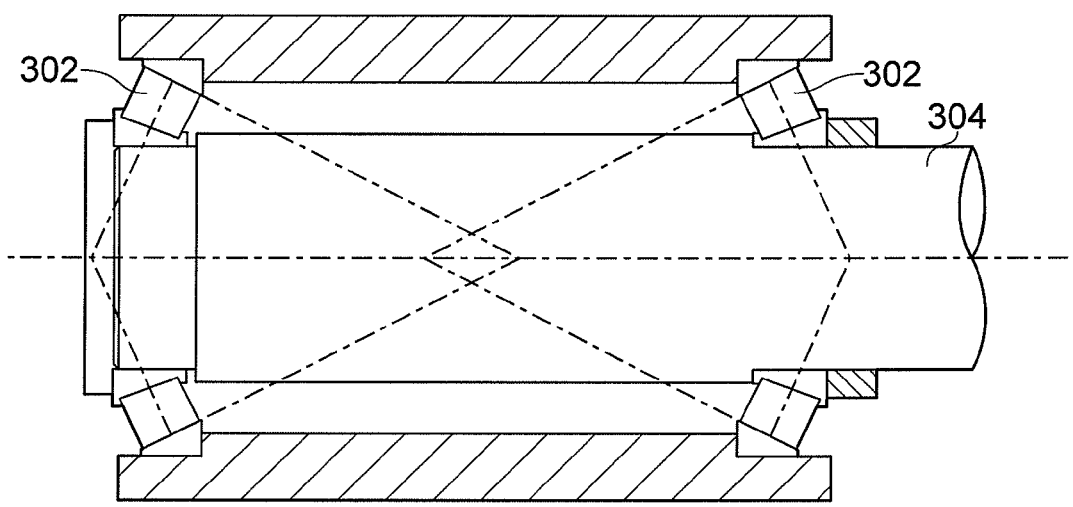
Figure 1D:
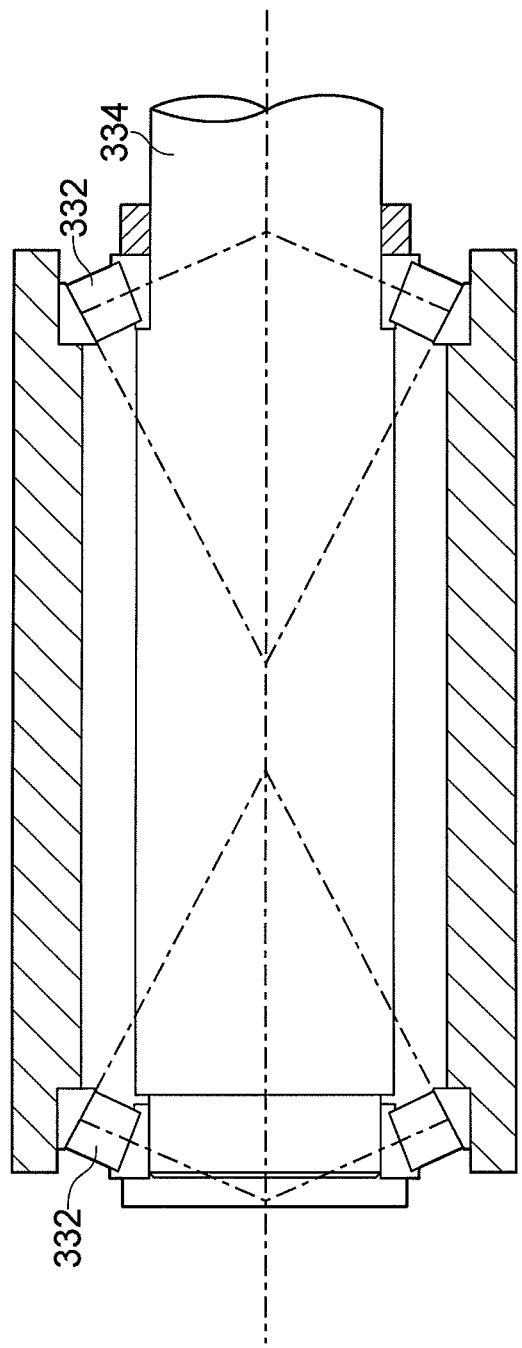

In the embodiment of FIG. 2a, the actual separation of the bearings can be adjusted to choose the best overall performance, which may involve a compromise between the relative location of the roller cone apices as illustrated in FIGS. 1b, 1c and 1d such that the change in preload over the operating range of temperatures is acceptable.

It may be possible to perform the bench setting operation under conditions that correspond to measured operating conditions from the location at which the bearing cartridge 400 will be fitted. For example, the temperature of the components with which the bearing cartridge will interact and/or the temperature of existing bearing components may be measured and utilised for setting the parameters of the bearing cartridge 400 in question.

In some embodiments, the bench setting operation can be performed at room temperature, for example at 20 degrees centigrade, and a simulation of use of the bearing cartridge can be performed in order to take measurements of forces that are present in use. In examples where the operating temperatures/conditions are different to the simulation temperatures/conditions, an extrapolation of the measured results can be made to determine how the bearing cartridge would perform under operating temperatures/conditions.

In this embodiment the outer ring 414 is a free fit in the sleeve 404 and the inner ring 412 has an interference fit with the shaft 402. The screw threaded adjuster ring 418 can be adjusted to axially displace the outer ring 414 of the first bearing 406. With this structure, the distance between the first bearing 406 and second bearing 408 can be adjusted using the screw threaded ring 418 thereby adjusting the force that is applied to the shaft 402 by the bearings 406, 408.

It will be appreciated that the distance between the bearings 406, 408, and hence the preload, can be adjusted using the screw threaded ring 418 before the bearing cartridge 400 is coupled to an external gear 440. This can avoid, or reduce the necessity to, adjust the distance between the two bearings 406, 408 when the bearing cartridge 400 is coupled to the external gear 440.

In some embodiments it is possible to alter the axial stiffness of the sleeve 404, or at least to select a sleeve 404 that has a desired axial stiffness. Altering the axial stiffness of the sleeve 404 can be used to adjust the ratio of dimensional preload to force preload provided by the bearing cartridge. That is, as a shaft expands and exerts an increased force on the two bearings 406, 408, the axial stiffness of the sleeve 404 can allow the sleeve 404 to stretch and therefore not translate all of the dimensional increase into a force increase between the shaft 402 and the bearings 406, 408.

In some embodiments, the axial stiffness of the sleeve 404 can be controlled by suitable design of the number and placement of windows in the sleeve to accommodate moving parts in use. Alternatively, or additionally, the material, thickness and/or any other parameter of the sleeve 404 can be adjusted or designed so as to provide a desired axial stiffness of the sleeve.

It will be appreciated that the design and or adjustment of the bearing cartridge 400 can be made so as to maintain the preload on the bearings 406, 408 between a range of values for all operating conditions, and that this can improve the life of the bearings 406, 408 as they are not exposed to dynamic loads that are too high or too low.

In this example, a different type of adjuster is associated with the second bearing 408 and allows the axial displacement of the second bearing 408 to be adjusted. It will be appreciated that in some embodiments, an adjuster is only required for one of the two bearings 406, 408. The type of adjuster that is used may be any suitable component that allows the relative displacement of the two bearings 406, 408 to be adjusted, such that the preload associated with the bearing cartridge 400 can be controlled.

The second bearing 408 comprises an inner ring 420 and outer ring 422, in between which are mounted a plurality of tapered rollers 424. The second bearing 408 may be considered as being at a distal end of the bearing cartridge 400 as it is furthest from the end of the bearing cartridge 400 that is configured for attaching to a housing (not shown), in use. In this embodiment, the adjuster consists of a retaining cap 426 over an end of the shaft 402 and the inner ring 420 of the second bearing 408. The retaining cap 426 may be attached to the shaft 402 by bolts 432, for example three bolts 432.

One or more shims 434 are located between the retaining cap 426 and the shaft 402 and are clamped between the retaining cap 426 and the shaft 402 by the bolts 432. The number of shims 434 can be increased or decreased to adjust the inner ring position by mechanical means. In this way, the number of shims 434 that are present can be used to adjust the preload by adjusting the clearance between the retaining cap 426 and the shaft 402.

An example setting procedure for the second bearing 408 would be to initially use oversize shims 434, clamp the retaining cap/plate 426 to the shaft 402 and measure an "end float". "End float" occurs when the bearings 406, 408 do not exert any force on the shaft 402, and "zero end float" occurs when the bearings 406, 408 are just touching the shaft 402 but not exerting any force on the shaft. Any force that is applied to the shaft is known as preload. Then, a requisite number of shims 434 can be removed in order to provide the required preload, and the retaining cap/plate 426 is re-clamped to the shaft 402 thereby securing the remaining shims 434. The torque of the shaft 402 in the bearing cartridge 400 can then be checked to ensure that the bearing cartridge provides the desired preload.

It will be appreciated that in some embodiments, either or both of the shims 434 and adjusters 418 may be provided to adjust the preload, and that both are not necessarily required. In other embodiments, other ways of adjusting the preload may be provided.

Although torque values can be calculated theoretically, it is an advantage of some embodiments of the invention that the actual torque values can be confirmed before the bearing cartridge 400 is located at an in use position, and can be used as an exercise on a series of assemblies to determine torque values. In some examples, the end float is calculated for taper roller bearings with the shaft having some rotation, and with the shaft loaded in each direction to allow the rollers to wind into the outer ring. This may be useful where the rollers will not slide over the shaft, for example at certain cone angles.

In this embodiment, the shaft also has an inlet 428 that is in fluid communication with a conduit 430 defining an annular groove on the surface of the shaft 402 that is next to the inside surface of the inner ring 420. As fluid is pumped into the inlet 428 it is forced along the annular groove between the bearing and the shaft and applies a radial force to the inner ring 420, thereby reducing the contact friction between the bearing 408 and the shaft 402. This can be used to adjust the location of the inner ring and hence needs only low forces to axially move the inner ring 420.

In some embodiments, LOCTITE anaerobic adhesive (which may be an aerobic adhesive or a similar material) can be injected into a cavity such as the annular groove so that the distance between the two bearings can be set and fixed. The LOCTITE anaerobic adhesive can feed into an annular clearance gap to take up the clearance and effectively give the same effect as an interference fit when it sets. This feature may be particularly useful for embodiments where the bearing inner ring is a free fit on the shaft and hence easily adjustable before setting the LOCTITE anaerobic adhesive.

The design of the sleeve 404 and/or angle of the roller cone bearings 416, 424 (cone points) is performed so that the preload fits into a range of preload values under operating conditions, particularly under expected operating temperatures. That is, the preload is maintained above a minimum value and below a maximum value.

Figure 2D:
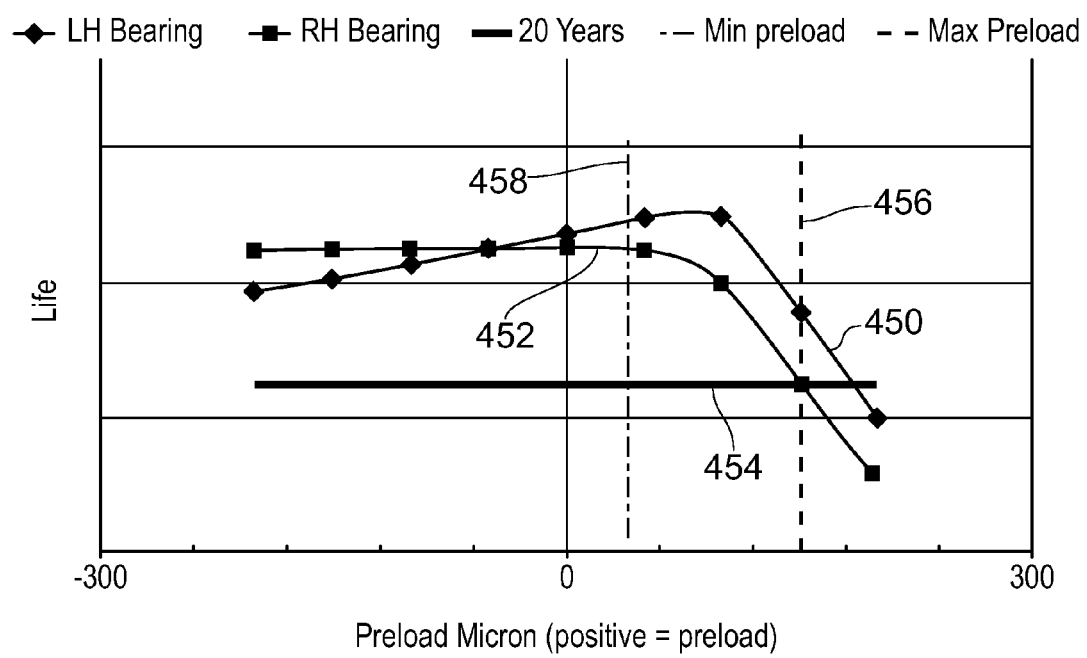
FIG. 2d shows graphically results of bearing preload sensitivity analysis.

Bearing preload sensitivity analysis is performed when the bearing life is being assessed to enable a suitable preload or end float to be set for the bearing cartridge. FIG. 2d shows example results of bearing preload sensitivity analysis for the two bearings of FIG. 2a. The preload sensitivity is calculated at the equivalent dynamic load used for rating the gears to which the bearing cartridge will be coupled. The preload sensitivities for the other bearing arrangements are broadly of the same form and magnitude as shown in FIG. 2d. It will be appreciated that only one set of curves is shown in FIG. 2d, and that the curves are shown for comparison purposes.

The horizontal axis of FIG. 2d shows the preload in microns, wherein a negative value for the preload represents end float. The vertical axis represents the lifetime of the bearing. A first curve 450 with diamond shaped data points represents the bearing life plotted against preload for the equivalent design load for the left-hand bearing, and a second curve 452 with square shaped data points represents the bearing life plotted against preload for the equivalent design load for the right-hand bearing.

Also shown in FIG. 2d is a straight horizontal line 454 that illustrates a desired bearing lifetime of 20 years. The maximum preload that can be applied to the bearing pair without causing failure is shown as vertical dashed line 456, and is the lowest preload that one of the bearings will not exceed 20 years lifetime as shown by the intersection of the first of the curves 450 and 452 and the line 454 that represents the desired lifetime.

The minimum preload for the bearing pair is shown in FIG. 2d as a vertical dot-dashed line 458. The minimum preload is the amount of preload that must be applied to the bearing at times of zero torque to ensure that the equivalent radial bearing load is sufficient to prevent skidding or sliding that can damage the bearing. For example, a sufficient equivalent radial bearing load may be 2% of the dynamic rated capacity of the bearing.

In use, the bearing arrangement can be subject to any conditions between maximum torque through to zero torque, or even negative torque for a period of perhaps a few seconds. Therefore it can be important to keep the preload of the bearing arrangement between the maximum and minimum preload values (as illustrated by the two vertical lines 456, 458) at all times. The horizontal space between the two vertical lines 465, 458 can represent a window for safe bearing operation.

Figure 2E:
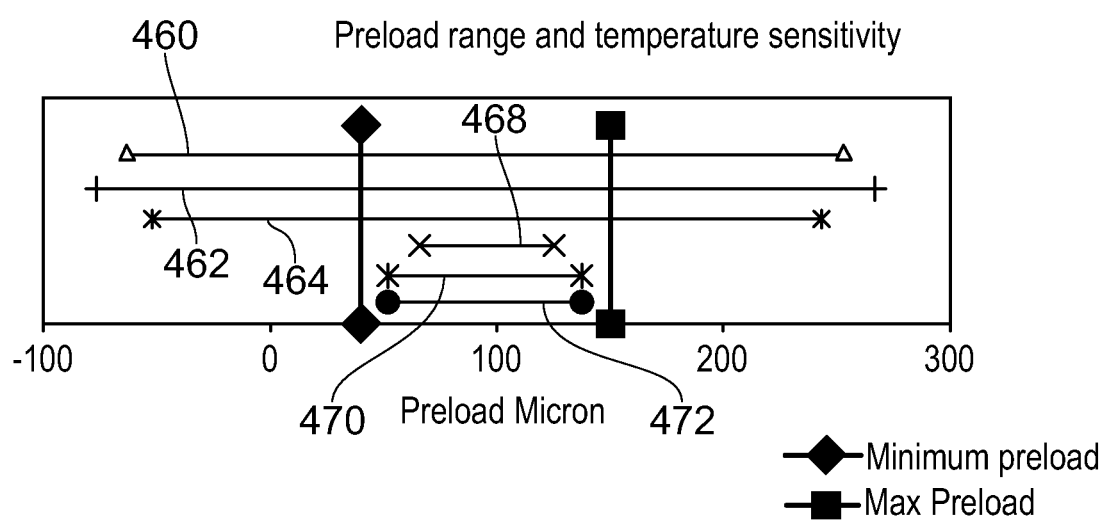
FIG. 2e shows graphically results of temperature sensitivity analysis.

An analysis of the achievable preload to temperature sensitivity of prior art bearing arrangements as well as the temperature sensitivity of bearing arrangements according to embodiments of the invention, are shown in FIG. 2e. The analysis represented by FIG. 2e has been performed using the simplified model consisting of the same materials and uniform temperatures of inner and outer components, and a difference in temperature of 20° C. between inner and outer components. This can be considered as a temperature range that is likely to occur when the bearing cartridge is in use, although is used only for illustration purposes. Values are shown in the table below.

| Arrangement | Mounting Position | Spacing | Preload increase for 20 Deg C. (Micron) | Initial setting tolerance (Micron) | Allowance required (Micron) |
|---|---|---|---|---|---|
| Face to face | Separated by gear | As required | 258 | 60 | 318 |
| Face to face | Adjacent to each other at shaft end | As required | 284 | 60 | 344 |
| Back to back | Adjacent to each other at shaft end | | 239 | 60 | 299 |
| Back to back | Separated by gear | coincident cone point | 0 | 60 | 60 |
| | | 80% | 26 | 60 | 86 |
| | | 120% | −26 | 60 | 86 |

Figure 1E:
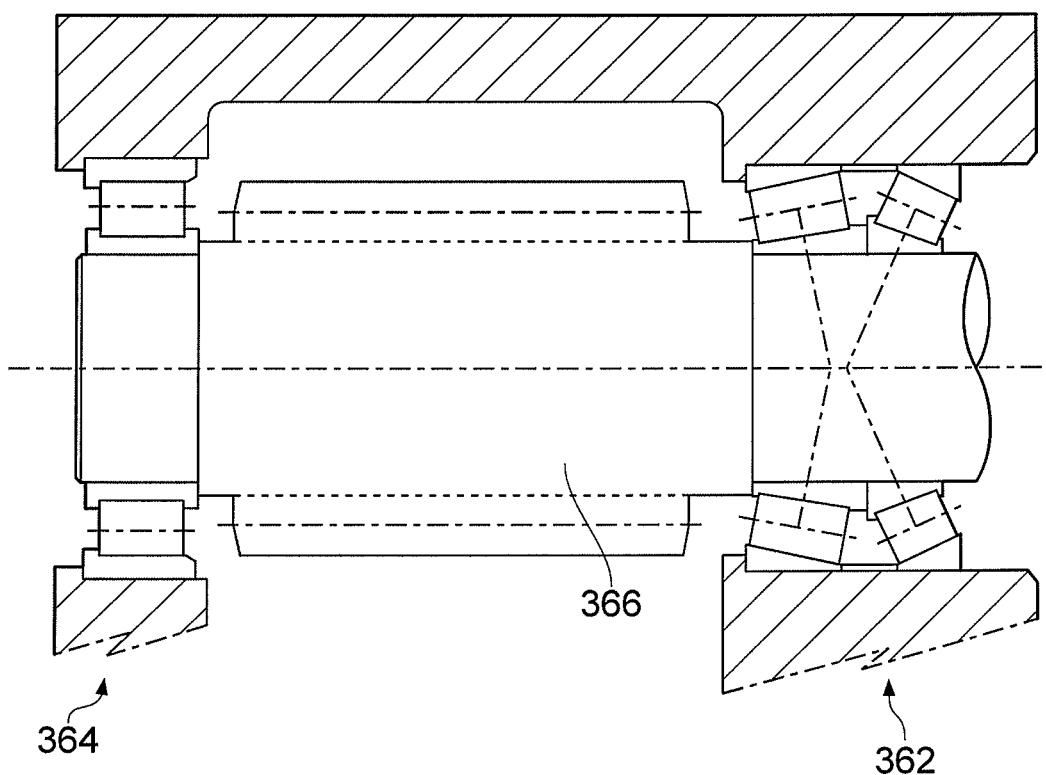
Figure 1F:
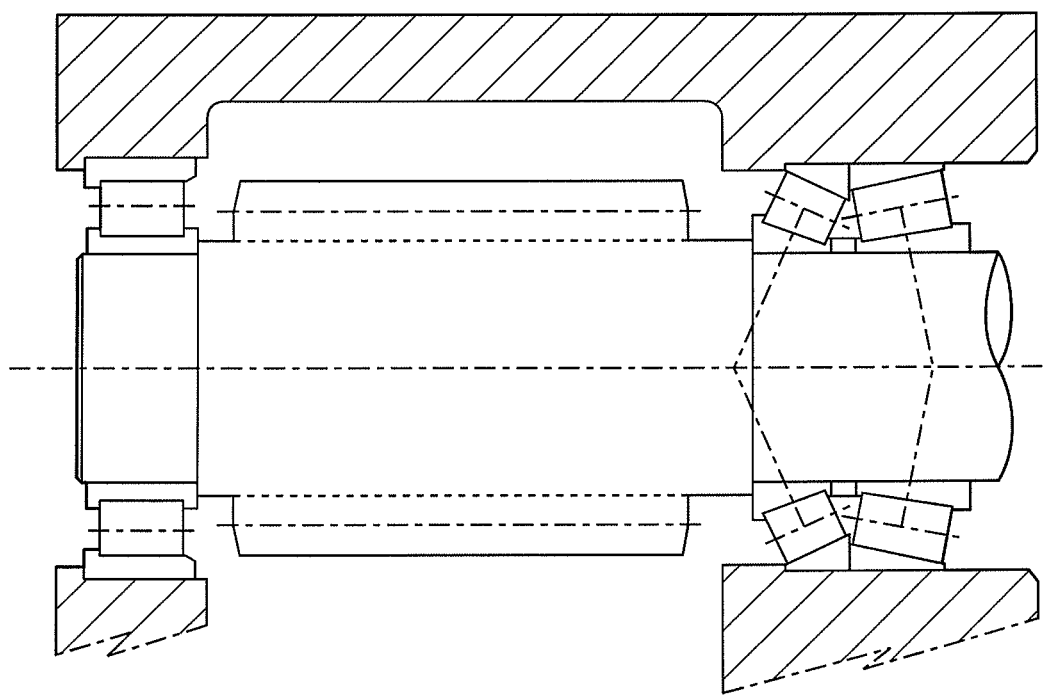

A face to face bearing arrangement that is separated by a gear is shown with reference 460 in FIG. 2e. A face to face bearing arrangement, adjacent to each other at a shaft end, has reference 462 in FIG. 2e, and represents a bearing that is similar to the prior art example shown as FIG. 1e. A back to back arrangement, adjacent to each other at shaft end, has reference 464 in FIG. 2e, and represents a bearing that is similar to the prior art example shown as FIG. 1f. It can be seen from the above table of values, and the graph of FIG. 2e, that the allowance that is required for operating the prior art bearing arrangements is greater than the desired window of preload values as shown in FIGS. 2d and 2e and discussed above, and therefore these bearings would be likely to fail.

The three bearing arrangements shown with references 468, 470, 472 are back-to-back bearing arrangements, separated by the gear, according to embodiments of the invention with different cone point separation. Reference 468 represents coincidental cone points, reference 470 represents spaced apart cone points, and reference 472 represents overlapping cone points.

The fourth column of values in the above table is the calculated change in preload (where a positive value represents an increased preload), and the fifth column is an assumed setting tolerance. Although the same assumed tolerance has been used for the prior art bearing arrangements and the bearing arrangements of the invention, it will be appreciated that in some embodiments the tolerances that are achievable with embodiments of the invention may have lower values than is possible in the prior art as the preload can be set under laboratory conditions, or at least under conditions that can be considered as more controlled than when the bearing is coupled to an external gear. The last column in the table shows the combined result of temperature sensitivity and setting errors and minimum allowance for preload required.

It can be seen from FIG. 2e that only the preload range represented by embodiments of the invention with references 468, 470, 472 enable a preload to be achieved that is within the desired range. In this example, all of the other configurations are out by a factor of three or more.

The illustration is not intended to be taken as an exact example but the values can be seen to show major difficulties with each of the prior art configurations. The use of 80% and 120% cone separation are only for illustration, and are not to be regarded as limiting examples. In some embodiments, an exactly coincident cone point may not be the best solution, and a more detailed analysis may show that slightly overlapping or spaced-apart cone positions may give better overall results over a larger range of operating conditions.

Embodiments described herein can enable the dynamic load of a bearing to be kept in a predefined range of values whilst the bearing is in use, which can improve the lifetime of the bearing.

In this example, the minimum value that defines the bottom end of the range is 2% of the load rating for the bearing as for certain arrangements this can reduce the probability that the bearings slide or skid, which can lead to failure of the bearing. It will be appreciated that in other embodiments a different minimum value may be required to achieve the same result.

In a wind turbine environment, the shaft can be running with almost zero power and therefore zero bearing load at some times. With conventional paired bearings (both face-to-face and back-to-back), the preload sensitivity does not allow bearing equivalent radial load to stay within the desired range of values. One way to achieve this aim as provided by an embodiment of the invention is to use axial preload on a set of back-to back bearings mounted in a cartridge, where the temperature preload sensitivity is very small. The minimum load can then be achieved even when zero power is running through the gearbox.

The maximum value of the range may be defined as the amount of load that still enables the desired lifetime to be achieved. This value may be calculated using the catalogue value for the specific bearing as discussed above, or may be determined empirically.

In some embodiments, the material that is used to manufacture the sleeve 404 and/or the size and shape of the sleeve 404 can be selected such that it has an axial stiffness that is used as part of the design of the bearing cartridge to set the desired preload of the bearings 406, 408. For example, any flexibility in the sleeve 404 can absorb some of the dimensional preload. Any windows in the sleeve 404 can be used to set the overall axial stiffness of the sleeve 404. It will be appreciated that the stiffness of the sleeve 404 should be high enough to maintain the bearings 406, 408 in the correct position relative to the shaft 402 and support the load between the bearings 406, 408.

In some examples, the dimensional increase in the distance between the bearings 406, 408 as the shaft heats up may be 400 microns, whereas an increase in excess of 100 microns can cause the load to reach a value that is outside the desired range. In such examples, flexibility in the axial stiffness of the sleeve 404 can account for some of the dimensional increase and the sleeve can absorb some of the force that would otherwise be applied to the bearings 406, 408.

Figure 3A:
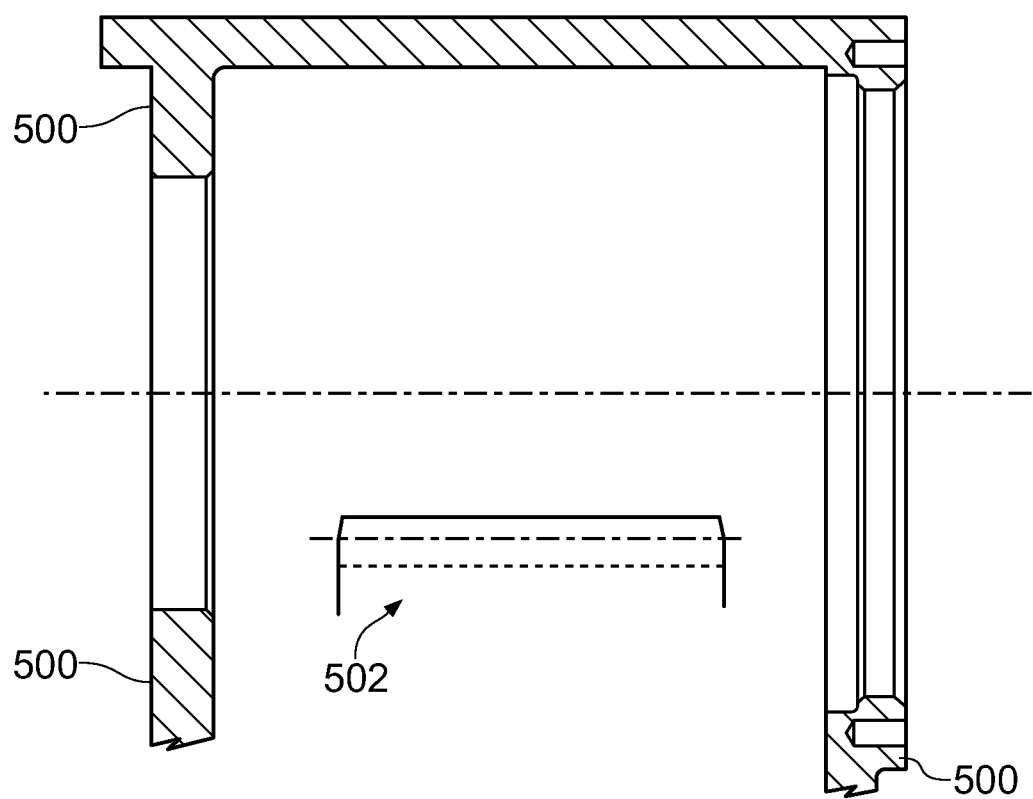
FIG. 3a illustrates a cross sectional view of a gearbox housing and gears that can be used with a bearing cartridge of an embodiment of the invention.

FIG. 3a illustrates a cross sectional view of a gearbox housing 500 and gears 502 that can be used with a bearing cartridge of an embodiment of the invention.

Figure 3B:
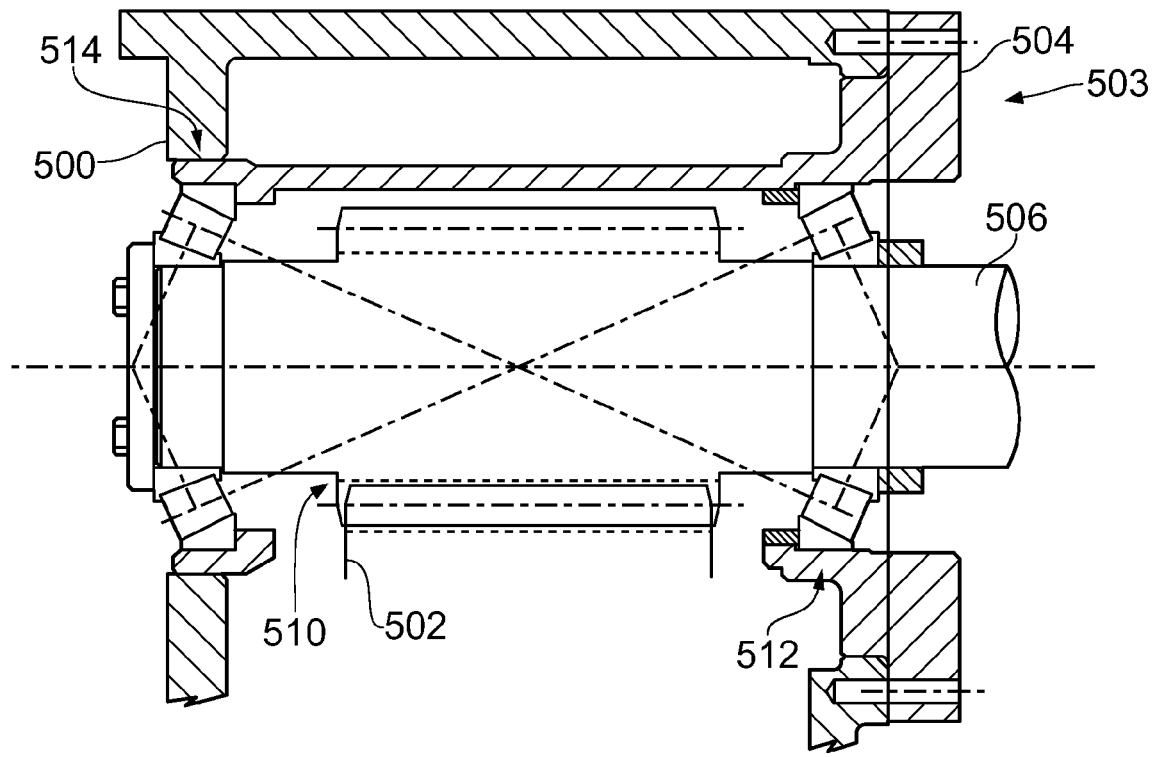

FIG. 3b shows a bearing cartridge 503 according to an embodiment of the invention coupled to the gears 502 of the gearbox of FIG. 3a. As discussed above, the physical parameters of the bearing cartridge 503, which may include the axial displacement of the two bearings 512, 514, have been set so as to apply a desired amount of preload to the bearings 512, 514 when the bearing cartridge 503 is in use.

As described in relation to FIG. 2, the physical parameters of the bearing cartridge may be adjusted before the cartridge 503 is fitted to the gears 502 of the gearbox housing 500. Alternatively, the bearing cartridge 503 may be manufactured such that the physical parameters provide the desired amount of preload without requiring adjustment.

Figure 3C:
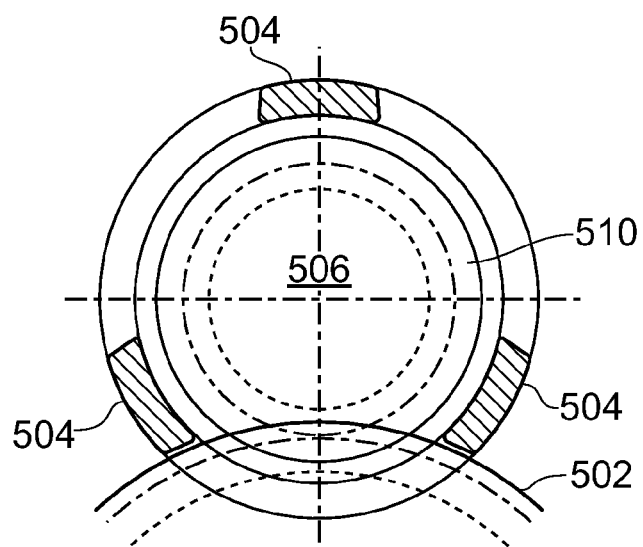
FIG. 3c illustrates a cross sectional view through assembly of FIG. 3b.

FIG. 3c illustrates a cross sectional view through the sleeve 504, shaft 506, gears 502 of the gearbox, and the gears 510 of the bearing cartridge 503. The gears 502 of the gearbox mesh with the gears 510 on the shaft 506 through one of three windows in the sleeve 504, as can be seen in both FIGS. 3b and 3c.

Figure 4:
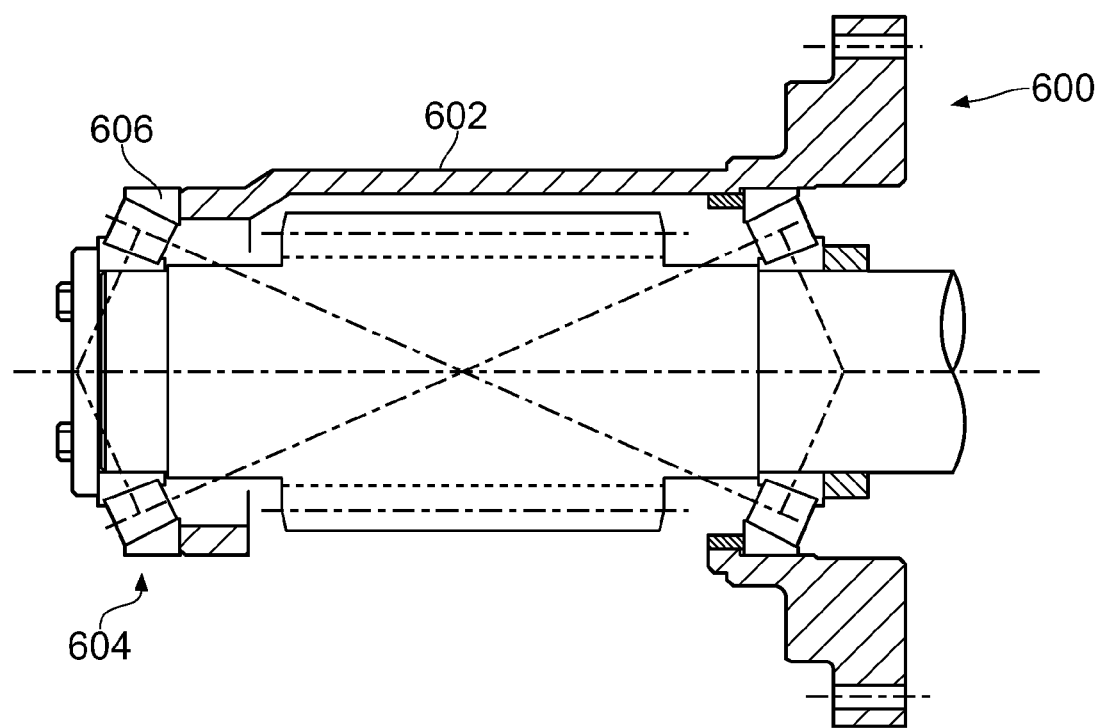
FIG. 4 illustrates a bearing cartridge according to another embodiment of the invention.

FIG. 4 illustrates a bearing cartridge 600 according to another embodiment of the invention. In this example, the outer ring 606 of the second bearing 604 is mounted directly into a housing (not shown) and not within the sleeve 602 of the bearing cartridge 600. The sleeve 602 provides an axial restraint for the second bearing 604. Such an embodiment can provide an advantage that the diameter of the bearing cartridge 600 can be reduced, and this may enable the bearing cartridge 600 to be more easily fitted into a housing such that the gear mounted on the shaft can inter-engage with an external gear.

Figure 5:
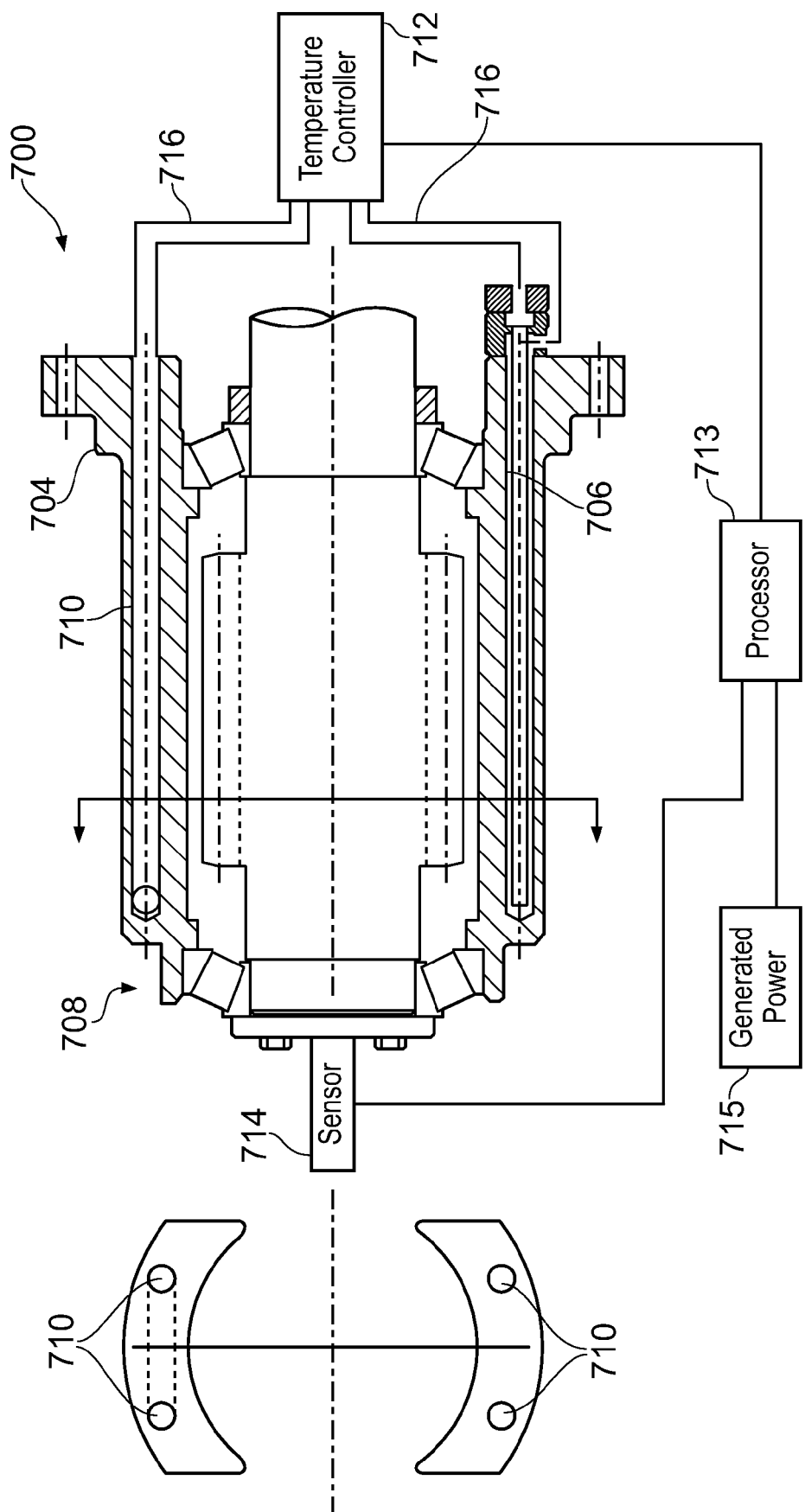
FIG. 5 illustrates an alternative bearing cartridge according to an embodiment of the invention.

FIG. 5 illustrates a bearing cartridge 700 according to another embodiment of the invention. In this embodiment, the sleeve 704 of the bearing cartridge has a number of internal galleries/conduits 710 through which oil, or any other heat carrying fluid, can be pumped. The galleries are in fluid communication with a temperature/heat controller 712 by pipes 716. The heat controller is configured to control temperature in accordance with received signals from a processor 713. The processor 713 in turn receives signals from a sensor 714 associated with the bearing cartridge 700, and/or receives a signal 715 representative of the power generated by a gearbox that is coupled to the bearing cartridge 700.

In some embodiments, the sensor 714 may comprise one or more strain gauges that are configured to measure axial load in the bearing cartridge. The one or more strain gauges may be attached to the legs of the sleeve (that is the portions of the sleeve between the windows) of the bearing cartridge to measure the axial load. In examples where more than one sensor 714 is used (for example, at least three sensors may be required), the sensors 714 may be distributed radially around the cartridge/sleeve.

The sensor 714 may be a temperature sensor or a mechanical sensor that can determine the load that is being placed on one or both of the bearings 706, 708. Either way, the processor 713 can process the signals received from the sensor 714 to determine if the load on the bearings 706, 708 is, or is likely to be, too high or too low.

The power 715 that is transmitted by a gearbox to which the bearing cartridge 700 is fitted can also be used by the processor 713. The power 715 may be used in combination with data received from the one or more sensors 714. In this way, the processor can determine if any forces that are experienced by the bearings are due to preload or operating load. For example, if a strain gauge sensor 714 provides data indicative of a high force through the sleeve 704 and the generated power data 715 represents zero power being generated by the gearbox, then the processor 713 can determine that the force experienced by the sleeve (and hence the bearings) is solely due to preload and not operating load. Conversely, if the generated power data 715 represents a high power being generated by the gearbox then the processor 713 can determine that a force experienced by the sleeve is due to a combination of operating load and preload.

In some examples, different types of sensors 714 may be used to determine if the level of preload is acceptable. For example, strain gauges may be provided for measuring the force on the legs in between the windows of the sleeve 704 and a power sensor may be provided for measuring the torque being provided by a gearbox to which the bearing cartridge is fitted. In this way, the values that are sensed by the strain gauges can be interpreted in accordance with a determination as to whether or not the shaft of the bearing cartridge is rotating. It will be appreciated that a determination as to whether or not the shaft of the bearing cartridge is rotating can be made using data returned from the sensor that measures the torque of the gearbox, or any other suitable sensor.

In this embodiment, if the load on the bearings is determined to be too high, then the processor 713 causes the heat controller to pump oil having a temperature lower than the sleeve 704 through the galleries 710 in order to decrease the temperature of the sleeve 704. It will be appreciated that as the sleeve 704 cools down, it contracts, and therefore causes less force to be exerted on the shaft by the bearings 706, 708. Similarly, if the preload on the bearings 706, 708 is too low, then warm oil is pumped through the galleries 710 in order to cause the sleeve 704 to expand.

In this way, feedback from the bearing cartridge 700, or a component associated with the bearing cartridge such as the shaft 702, and/or feedback from an associated gearbox such as the torque/power of the gearbox, can be used whilst the bearing cartridge is in use to adjust the preload on the bearings 706, 708. This can be used to ensure that the preload on the bearings does not exceed or fall below threshold values that could lead to failure.

In other embodiments, the temperature of the bearing cartridge in use could be controlled using any temperature controller, including an electric heater. In examples where the temperature controller is a heater that cannot be used to decrease the temperature of the sleeve, then the sleeve may be initially designed such that the desired preload is provided when the sleeve is at an artificially high temperature. In this way, the heater will usually be on such that the desired preload values are achieved. If there is a requirement to decrease the preload then the heater can be turned off to effectively cool the sleeve using environmental conditions. Conversely, if the preload is too low, then the heat output of the heater can be increased to expand the sleeve.

It will be appreciated that the sensor can monitor the temperature, mechanical forces/stress, or any other parameter of any one of the components of the bearing cartridge 700, shaft 702 or device (such as a gearbox) to which it is fitted. The sensor is configured to monitor characteristics that are indicative of the load that is being applied to the one or both of the bearings 706, 708.

For example, the gearbox may be brought up to running temperature from say −30° C., and the temperature controller may be used to increase the temperature of the sleeve of the bearing cartridge for a period of time whilst the gearbox is getting up to temperature. The parameters of the bearing cartridge may be configured so as to provide a satisfactory preload when the bearing cartridge is up to an operating temperature without the use of a temperature controller.

Figure 6:
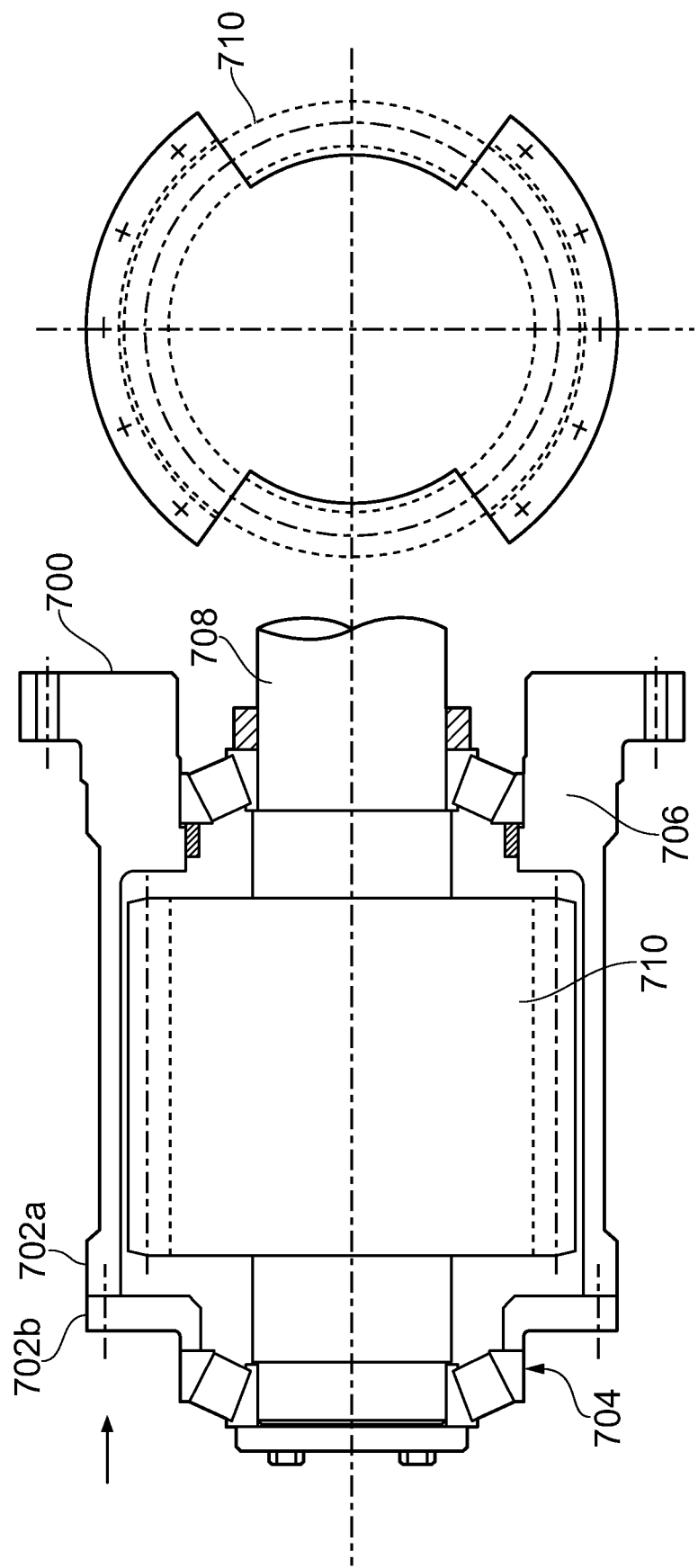
FIG. 6 illustrates another bearing cartridge according to an embodiment of the invention.

FIG. 6 illustrates a bearing cartridge 700 according to a further embodiment of the invention. FIG. 6 shows a side view in cross-section and an end view of the bearing cartridge 700. Features of the bearing cartridge 700 of FIG. 6 that are common to features of a bearing cartridge described above, will not be described in detail with reference to FIG. 6.

In this embodiment, the bearing cartridge 700 comprises a first sleeve portion 702a and a second sleeve portion 702b that are releasably connectable together. When the first sleeve portion 702a and the second sleeve portion 702b are connected together, they are adjoined in a longitudinal direction along the shaft 708. The first sleeve portion 702a and second sleeve portion 702b may be releasably connectable together by bolts, a spigot or any other means.

The first sleeve portion 702a supports the first bearing 706 in a radial and axial direction, and the second sleeve portion 702b supports the second bearing 704 in an axial direction. It will be appreciated that in other embodiments, the second sleeve portion 702b can support the second bearing 704 in an axial and radial direction in a similar way to that shown in FIG. 2a.

The first sleeve portion 702a contains at least one aperture, through which a gear connected 710 to the shaft 708 of the bearing cartridge 700 is exposed. In some examples, the second sleeve portion 702b can comprise the at least one aperture, and the first and second sleeve portions 702a and 702b can be configured so that they join at a location that is between the gear 710 and the first bearing 706.

In other examples, both the first and second sleeve portions 702a, 702b can comprise at least a portion of an aperture such that the first and second sleeve portions 702a, 702b join at a location between the ends of the aperture. The first and second sleeve portions 702a, 702b may join at a location that is part-way along the gear 710.

Providing such a two-part sleeve arrangement can enable a gear 710 that is bigger than the bearings 704, 706 to be located between the bearings 704, 706. That is, the first sleeve portion 702a can be located around the gear 710, and then the second sleeve portion 702b can be connected to the first sleeve portion 702a. In this way, it can be possible to provide a bearing cartridge having a gear 710 that is diametrically larger than the bearings 704, 706.

When coupling the bearing cartridge 700 to an external gear (not shown), the first and second sleeve portions 702a, 702b can be disconnected from each other. This can enable the first sleeve portion and the shaft to be located at an in-use position, thereby coupling the gear 710 to the external gear. In embodiments where the gear teeth extend diametrically beyond the bearings 704, 706, the gears can be coupled together without having to insert the bearing cartridge at an angle so that the external gear can slot through an aperture in the sleeve 702. In other embodiments, where the gear teeth do not extend beyond the bearings, the bearing cartridge may be inserted into a gearbox at an angle to the longitudinal axis of the bearing cartridge when it is coupled to the gearbox in an in-use position.

In some examples the apertures in the first sleeve portion 702a can extend up to the boundary between the first and second sleeve portions 702a, 702b. This can enable the first sleeve portion to be located at an in-use position, thereby coupling the gear 710 to the external gear, without having to insert the bearing cartridge at an angle so that the external gear can slot through an aperture in the sleeve 702. In this example, the second sleeve portion 702b can be disconnected from the first sleeve portion 702a, the first sleeve portion can be inserted into a gearbox in a direction that is substantially parallel to the axis of the shaft 708, and the second sleeve portion 702b can then be connected to the first sleeve portion 702a. An advantage associated with fitting a bearing cartridge in this way can be that the access hole in a casing that is required to fit the bearing cartridge can be kept relatively small as the bearing cartridge may not need to be inserted at an angle to its in-use position.

The second bearing 704 can have a smaller diameter than the maximum diameter of the sleeve 702. The diameter of the second sleeve portion 702b that supports the second bearing 704 can have a smaller diameter than the maximum diameter of the sleeve 702. The two-part sleeve 702a, 702b can enable the diameter of the end of the bearing cartridge that is to be mounted within a gearbox (the end corresponding to the second bearing 704) to be smaller than the gear located between the bearings 704, 706, which may not be possible/convenient when compared with other examples.

The bearing cartridge 700 of FIG. 6 can be considered as particularly advantageous for examples where a large gear 710 is mounted on the shaft 708 of the bearing cartridge 700, as such a large gear would otherwise require a large access hole in a casing to mount the bearing cartridge 700 to an external gear.

An embodiment of the invention may be useful for servicing a gearbox, or any other device that uses a shaft. In a wind turbine example, a crane and lifting apparatus may be required to lift the bearing cartridge for placement in the nacelle of the wind turbine. In some embodiments of the invention, lifting the complete gearbox from the nacelle may not be required to fit the bearing cartridge.

A bearing cartridge described herein may be more easily removed and replaced from a shaft when compared with the prior art. For example, a bearing cartridge that is used in a wind turbine gearbox may be removed and replaced without requiring machinery to remove the gearbox. Also, any adjustments to the preload that are required can easily be made by adjusting one or more of the physical parameters of the cartridge, such as adjusting the distance between two bearings in the cartridge, when the bearing cartridge/shaft is not coupled to a gearbox. Adjusting the preload in this way can enable any variations in the environment of the bearing cartridge that were not predicted when performing theoretical calculations/simulations to be accounted for.

It will be appreciated that bearing cartridges described herein are not limited to the number of teeth on the gear of the bearing cartridge or the size of the gear. In some embodiments it may be possible to replace a gear of the bearing cartridge with a different gear depending upon the required use, or the cartridge could otherwise work with different gears in any way. More than one gear may be provided on the shaft of the bearing cartridge. An example of when different gears may be required is for off-shore and on-shore wind turbines. Other components of the bearing cartridge may not need to be changed for different uses, as the sleeve may accept different sized gears.

In some embodiments described herein, it may be possible to use standard bearing angles, as the requisite preload provided by the bearing cartridge can be controlled/adjusted as described above without having to change the angle of the bearings. This can reduce the cost of the assembly as it is not necessary to have taper roller bearings specially made with the desired angles.

Advantages that may be provided by one or more embodiments of the invention can include achieving a neutral preload temperature characteristic of the bearing arrangement when it is in use, such that axial dimensional changes cancel the effect of radial dimensional changes. The axial stiffness of the sleeve can be controlled to achieve a small change in preload force with a change in axial preload. The cartridge can allow bench setting methods to be used to set the preload, in particular to keep the dynamic equivalent load on the bearing between a range of values when it is in use. The cartridge can have one or more windows to allow gears to mesh through the bearing cartridge, and in some embodiments the windows can be used to control the stiffness of the sleeve of the bearing cartridge.

Embodiments described herein can be particularly suitable for conditions that exist in wind turbine gear boxes. In such situations the bearing should be designed to last for 20 years, and in such high speed shafts this can be the order of $10^4$ million cycles. Therefore the C/P ratios (as discussed above in relation to the formula for calculating the lifetime of a roller bearing) need to be high to achieve the required bearing life. In addition, the gearbox can often run at a very low percentage of rated torque due to variable wind conditions, and high accelerations of the shaft can exist as the wind speed fluctuates. The result in the prior art is that certain bearing arrangements cannot be designed so that conditions exist in which the load on the bearings does not fall below 2% rated capacity, or any other value that has been identified as reducing the likelihood of the bearing sliding or skidding. A bearing cartridge described herein may be particularly suitable for high temperature, high speed, high variability shafts.

One or more embodiments described herein can enable a bearing to be designed such that the load/preload can be more accurately controlled when the bearing is in use on a shaft as the dimensional characteristics of the bearing arrangements and/or sleeve can be adjusted when the bearing cartridge is in isolation from the shaft, and in some embodiments can take into account real measured values of the temperature of the shaft in use, as opposed to using theoretical values.

In some embodiments, a single spaced apart back-to-back bearing mounted in a sleeve may be sufficient to account for, and provide, both axial and radial load to the bearings. A further bearing at another point on the shaft, such as a cylindrical roller, to account for radial load may not be required. In this way, it may be possible to ensure that the load is substantially evenly spread across the bearings.

The invention claimed is:

1. A bearing cartridge for a wind turbine having a rotatable shaft, the bearing cartridge comprising:
   a shaft;
   a back-to-back tapered roller bearing arrangement coupled to the shaft, comprising:
      a first bearing having a first outer ring, a first inner ring and a plurality of tapered rollers; and
      a second bearing having a second outer ring, a second inner ring and a plurality of tapered rollers;
   a gear located on the shaft between the first bearing and second bearing;
   a sleeve for supporting an axial load between the first bearing and the second bearing and having one or more apertures that expose the gear for coupling to an external gear; and
   at least one adjuster positioned on a side of the first outer ring that faces the second bearing, the at least one adjuster configured to adjust an axial distance between the first bearing and the second bearing to an adjusted distance.

2. The bearing cartridge of claim 1, wherein:
   one or more physical parameters of the bearing cartridge are adjustable in order to vary a preload force that is applied to the bearing arrangement when it is fitted to the external gear.

3. The bearing cartridge of claim 1, wherein:
   a preload of the bearing arrangement is adjustable when the bearing cartridge is not fitted to the external gear.

4. The bearing cartridge of claim 1, wherein:
   the sleeve has an axial stiffness that is configured to enable a preload on the bearing arrangement to be maintained within a range of values for the preload when the bearing cartridge is in use.

5. The bearing cartridge of claim 1, wherein:
   the bearing cartridge provides a variation in a preload over the full running temperature range of the bearing arrangement between a minimum value preventing the bearings from sliding, skidding or otherwise degrading the quality of the bearings and a maximum value enabling the bearings to achieve a predetermined lifetime.

6. The bearing cartridge of claim 1, further comprising:
   a conduit through the shaft, the conduit opening into a cavity between the shaft and the inner ring of either the first or second bearing, wherein the cavity is configured to receive a, member selected from the group consisting of oil, liquid and LOCTITE through the conduit in order for the relative location of the first and second bearings to be adjustable.

7. The bearing cartridge of claim 1, wherein:
   the bearing cartridge is for a gearbox in the wind turbine.

8. A gearbox fitted with the bearing cartridge according to claim 1.

9. A wind turbine comprising the gearbox according to claim 8.

10. A wind turbine comprising the bearing cartridge for the rotatable shaft of the wind turbine according to claim 1.

11. The bearing cartridge of claim 1, wherein:
    the second bearing is located at a distal end of the bearing cartridge.

12. The bearing cartridge of claim 1, further comprising:
    an adjuster positioned at the second bearing configured to adjust the axial distance between the first bearing and the second bearing.

13. The bearing cartridge of claim 12, wherein:
    the adjuster at the second bearing comprises a retaining cap configured to be positioned over an end of the shaft.

* * * * *